United States Patent [19]

Close

[11] 4,062,426
[45] Dec. 13, 1977

[54] BEAM CELL AND MULTIPLE CELL TYPE STRUCTURAL ELEMENTS WITH VARYING SPRING CONSTANTS

[76] Inventor: Ross A. Close, 3831 Glenbrook Road, Fairfax, Va. 22030

[21] Appl. No.: 691,139

[22] Filed: May 28, 1976

[51] Int. Cl.² ............................................... F16F 7/00
[52] U.S. Cl. ...................................... 188/1 B; 52/167
[58] Field of Search ................. 52/167, 393, 401, 573; 188/1 B, 1 C, 1 R; 248/23, 358 R, 358 AA

[56] References Cited

U.S. PATENT DOCUMENTS

| | | | |
|---|---|---|---|
| 2,361,071 | 10/1944 | Vang | 188/1 B |
| 2,964,272 | 12/1960 | Olson | 188/1 B |
| 3,031,034 | 4/1962 | Thomas | 188/1 B |
| 3,952,979 | 4/1976 | Hansen | 188/1 B X |

*Primary Examiner*—Duane A. Reger

[57] ABSTRACT

This invention consists of a structural element assembled from a three-dimensional cantilever beam with coupled flexural and torsional rigidity, and the combining into a cell of two or more of these elements. The cells shall be combined to take the place of helical compression and tension springs. The three-dimensional cantilever shall have an open section with top and bottom flanges parallel to the plan of the beam, the top and bottom flanges being connected with a web normal to the plan. The support end of the beam shall be hinged with a pin normal to the plan and passing through both top and bottom flanges and the support structure. The spring constant for this beam shall be varied by generating a bimoment in the flanges at the pinned end. These structural elements and cells can be economically made by any structural fabricator by welding together metal plates and structural members.

4 Claims, 5 Drawing Figures

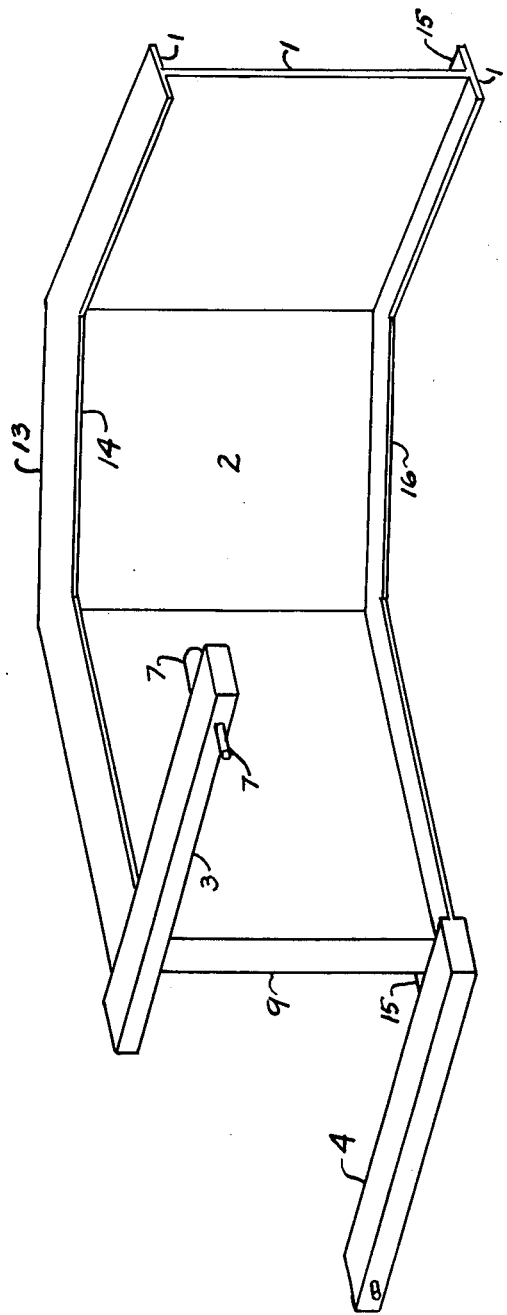

BEAM CELL AND MULTIPLE CELL TYPE STRUCTURAL ELEMENTS WITH VARYING SPRING CONSTANTS

BACKGROUND OF THE INVENTION

The need of controlling machine vibrations is recognized at the present time. The need for protection of atomic reactors from possible damage from earthquake vibration, an ever-present danger, is critical.

Metal springs occupy the unusual position that, in spite of the high modulus of elasticity of the material from which they are made, they act as admirable vibration isolators. The cantilever beam may be considered as a spring.

This invention consists of a structural element assembled from a three-dimensional cantilever beam with coupled flexural and torsional rigidity, and the combining into a cell of two or more of these elements. The cells shall be combined to take the place of helical compression and tension springs. The three-dimensional cantilever shall have an open section with top and bottom flanges parallel to the plan of the beam, the top and bottom flanges being connected with a web normal to the plan. The support end of the beam shall be hinged with a pin normal to the plan and passing through both top and bottom flanges and the support structure. See FIG. 1. The spring constant for this beam shall be varied by generating a bimoment in the flanges at the pinned end. These structural elements and cells can be economically made by any structural fabricator by welding together metal plates and structural members.

The following four tests were made in order to verify the functions of this structural element.

TEST NO. 1

This test was designed to carry most of the torsion in this curved cantilever beam by bending in the flanges. To accomplish this the torsional constant was made to approach zero by using very thin steel plates. The test beam was constructed of plates eighteen thousandths of an inch thick. The beam had an eye cross section with flanges 1 inch wide and the web of 4 inches. The beam was circular, curved in plan with a radius of 18 inches and an arc length of 28 inches. The beam was supported on a shaft with frictionless bearings in both flanges, thus making the bimoment zero at the support. This beam was observed to have a spring constant K of 1 ½ pounds per inch. A bimoment was induced in the flanges at the support sufficient to make the rotation in the flange zero and the spring constant was observed to be 4 pounds per inch.

TEST NO. 2

This test was similar in geometry to test 1 except the steel plates were one sixteenth of an inch thick. The cross section was again an I beam section with flanges 1 inch in width and a 2 inch web depth. The plan of the beam was circular with a radius of 18 inches and an arc length of 28 inches. The spring constant with both flanges hinged at the support was observed to be four pounds per inch. With an induced bimoment sufficient to make the rotation at the hinged support end zero, the spring constant was observed to be 8 pounds per inch.

TEST NO. 3

This test beam was made with an eye cross section. The two flanges used steel plates 3/16 inch thick with a width of 3 inches. The web was made of ⅛ inch steel plate 3 inches in depth. The beam was circular in plan with an average radius of 8.9 inches, with an arc length of 28 inches. The support end of this beam was hinged so that the bimoment in each flange was equal to zero. The spring constant K for this beam was measured as 66 ⅔ pounds per inch. This beam with an imposed bimoment which resulted in a zero rotation in both flanges had a spring constant K observed to be one hundred 2 pounds per inch.

TEST NO. 4

This test was made to compare a circular arc beam with a beam made up of two chords of the same circular arc beam. These two beams were made of 1/16 inch steel plate using an eye section having flanges one inch wide with a web depth of 1 inch. The circular arc beam had an average radius of 5 ¼ inches and an arc length of 16 ½ inches. The two-chord beam had a total length of 15 inches made up of two equal chords welded together. Both beams were hinged at the support end to allow the bimoment to become zero in each flange. The observed spring constant for the circular arc beam was 12 ½ pounds per inch. The spring constant K for the dog-leg chord beam was observed to be 10 ¾ pounds per inch.

DESCRIPTION OF DRAWINGS

FIG. 5 is a perspective of the cantilever beam showing the change in the top and bottom flanges from plates to rectangular lever arms, the locations of the segments of concentric polygons 13, 14, 15 and 16, and the location of plane 1.

DETAILED SPECIFICATIONS

Figure 1:
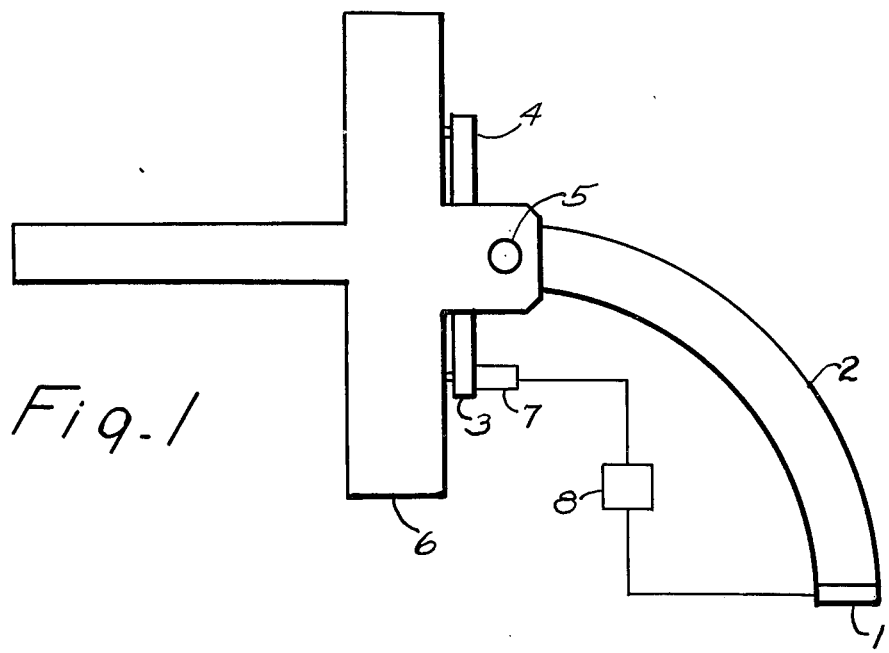
FIG. 1 of the drawings shows a top view of the new structural element. The tee shaped box beam support 6 for the three dimensional cantilever beam 2 appears in relief. The top flange 3 of the three dimensional cantilever 2 is partly covered by the portion of the top flange plate of the box beam 6 that contacts pin 5. The rectangular lever arm part of the top flange that extends along a radial line towards the center of the two concentric segments of polygons is shown extending out from under the portion of the top flange of box beam 6 that surrounds pin 5 and is shown terminating around hydraulic jack 7. The two segments of polygons appear as polygons with an infinite number of sides or two concentric circles containing the width of the top flange. The rectangular lever arm part of the bottom flange 4 that extends along a radial line away from the center of the concentric segments of polygons is shown extending out from under the portion of the top flange of the box beam 6 that surrounds pin 5 and is shown terminating around screw jack that contacts support box beam 6.
Figure 2:
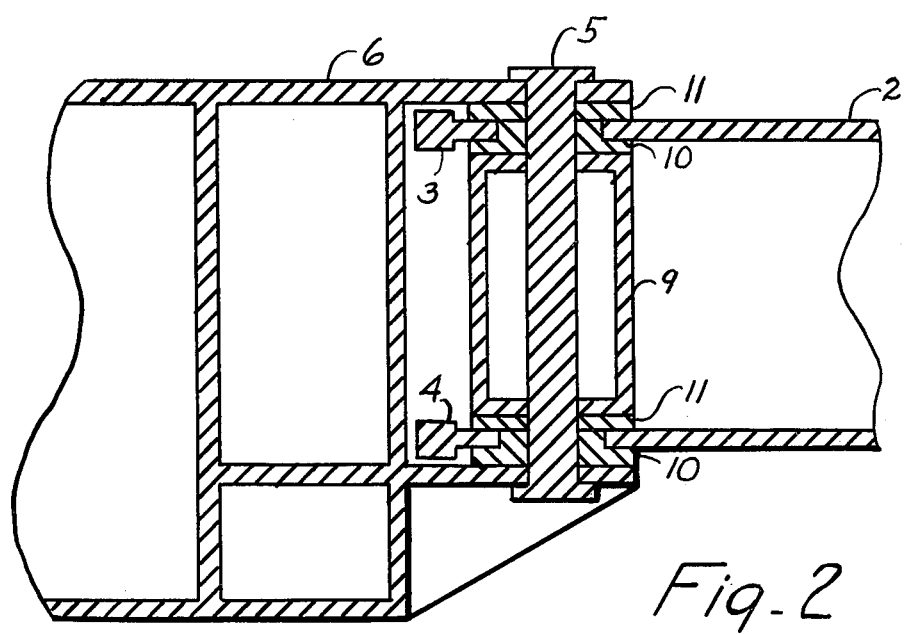
FIG. 2 is a partial section through the support pin 5, but not the center line of the pin, at right angles to the top view and indicates the top flange plate and top rectangular lever arm 3, the bottom flange plate and bottom flange rectangular lever arm 4, the cylindrical stiffener 9 surrounding pin 5 and bearings 10 and 11.
Figure 3:
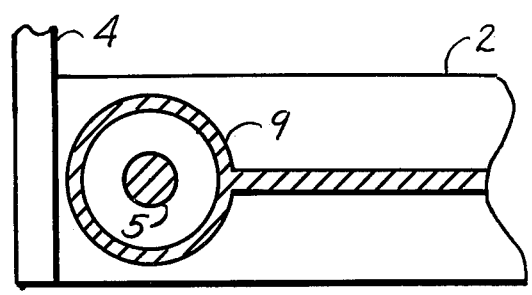
FIG. 3, parallel to the top view in FIG. 1, is a partial section through the support pin 5, showing a section through the web and the cylindrical stiffener around pin 5, and showing a top view of bottom flange 4, both plate and rectangular lever arm.

Definitions of the new three dimensional cantilever beam top flange, bottom flange and web:

The top flange 3 of the three dimensional cantilever beam consists of a metal plate fabricated such that the width is contained between two concentric segments of polygons 13 and 14 extending between a radial line through the center of a hole in the plate for pin 5 and a radial line through plane 1. The metal plate also extends around the hole for pin 5 and beyond sufficient distance to contain bearings 10 and 11. At this point the shape of the top flange is changed from a metal plate to a rectangular metal lever arm 3 extending along a radial line from the plate extension around bearings 10 and 11 toward the center to a hydraulic jack 7 attached to lever arm 3.

The bottom flange 4 consists of a metal plate fabricated such that the width is contained between two concentric segments of polygons 15 and 16 extending between a radial line through the center of the hole in the plate for pin 5 and a radial line through plane 1. These two concentric segments of polygons are contained in a plane parallel to the plane defined by the top flange at a distance from the top flange equal to the height of the web plate and located in the plane such that with the web at right angles to both flanges the flanges can be welded on opposite sides of the web. The bottom flange plate extends around the hole for pin 5 and beyond a sufficient distance to contain bearings 10 and 11 where the shape of the bottom flange is changed from a metal plate to a rectangular metal lever arm 4, which extends along a radial line from the plate extension around bearings 10 and 11 away from the center to a screw jack attached to lever arm 4.

The web of the three dimensional cantilever beam consists of a metal plate fabricated such that the height is contained between two parallel lines, the height being the same distance as the distance between the top and bottom flanges. The top view of the top edge thickness is contained between two concentric segments of polygons in the same plane as the top flange and falling between the two concentric polygons determining the width of the top flange. In the bottom view of the web the thickness of the web plate bottom edge is contained between two concentric segments of polygons in the same plane as the bottom flange and falling between the two concentric polygons determining the width of the bottom flange. The top edge of the web is welded to the top flange and the bottom edge of the web is welded to the bottom flange to form an open section, such as an I (eye), a channel C, or a Z (zee) cross section. The web extends from the cylindrical stiffener around pin 5 to plane 1 at the free end.

This new structural element consists of new parts as follows:

1. A new type of pin support for a three-dimensional cantilever beam making the bimoment approach zero at the support.
2. New flange lever arms used to generate a bimoment around pin 5 at the support.
3. A new cylindrical stiffener surrounding pin 5 and resting on bearings 10 and 11 to transfer forces at right angles to the top flange from the three dimensional cantilever beam to the support box beam 6.
4. The control of the spring constant in a three-dimensional cantilever beam by changing the support bimoment.
5. The combination of two or more of the new structural element continuously connected by a box beam to form a cell, and the assembling of an even number of cells to be used in the place of helical springs. Any odd number of cells shall be used to support a building column to protect the building against earthquake damage.

The box beam foundation connections and the three-dimensional beam are of conventional design.

Figure 4:
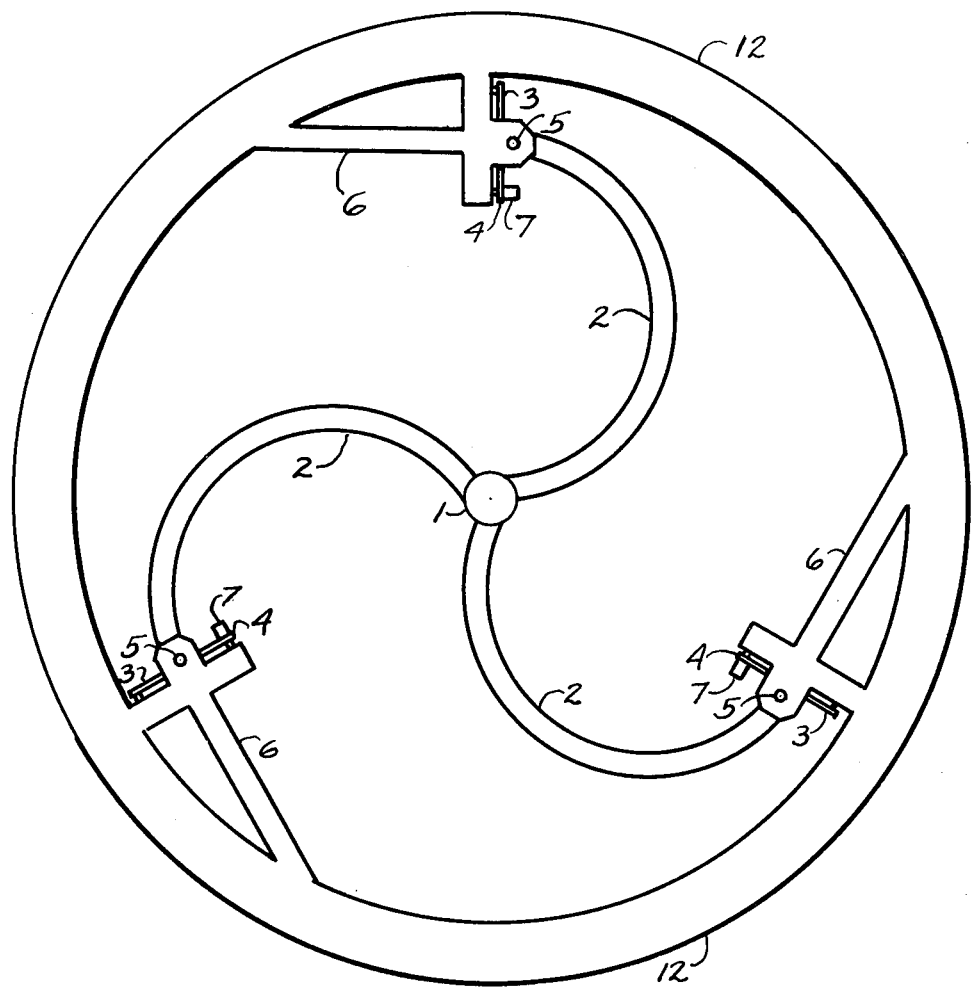
FIG. 4 shows a top view of the combination of three of the new structural elements assembled into a cell.

FIG. 1 shows the new structural element from a top view. The beam 2 is shown as a circular curved I (eye) beam. The support end is pinned by 5 to the foundation box beam 6. A load at right angles to the top flange shall be applied to plane 1. The load at right angles to top flange 3 at 1 generates flexure, causing tension in the top flange and compression in the bottom flange. The curved top view of the beam causes torsion shear across the entire I section and bimoment in the flanges. The vertical shear at the support from the load at right angles to the top flange at plane 1 is carried by the web through the vertical component cylinder 9 to the foundation 6. Pin 5 allows the top and bottom flanges to rotate on bearings 10 and 11, thus making the bimoment at this pin equal to zero when hydraulic jack 7 is relaxed. This is the lower limit of the spring constant. When the hydraulic jack 7 on top flange arm 3 is acturated, jack 7 pushes the free end of top flange arm 3 away from support 6 and the free end of bottom flange arm 4 is pressed against 6. This action generates a bimoment around pin 5 and increases the value of the spring constant. Some machines may be operated at more than one frequence of vibration, therefore it is advantageous to have a structural element in which the spring constant may be varied. In the case of structures subject to earthquake and pipes supported in the ocean subjected to wave action it is advantageous to have the structural elements connected together into a cell by a continuous box beam 12 and with a varying spring constant, as shown in FIG. 4. With automatic control, the amplitude of oscillation can be controlled by connecting black box 8 to a sensor at plane 1, which changes the spring constant when the amplitude exceeds a preconceived value, thus controlling the amplitude of oscillation.

In a sequence of cells numbered consecutively, an odd numbered cell is connected to the next higher even numbered cell at points along 12; an even numbered cell is connected to the next higher odd numbered cell at plane 1. In replacing a helical spring an even number of cells will be used; for compression supports at the two outer cells are at points along 12; for tension supports at the two outer cells are at plane 1.

I claim:

1. A structural element with varying spring constant consisting of a three dimensional cantilever beam with open cross section and a tee shaped metal box beam connected to a varying spring constant three dimensional cantilever beam at the junction of the tee box beam by a pin through top and bottom plates attached to the junction of the tee box beam and through both top and bottom flange plates extending away from the tee box beam along segments of polygons containing the width of the flanges to a free end carrying a load at right angles to the flanges, said flange plates being connected together by a web plate at right angles to the flanges, said flange plates extend-toward the tee box beam sufficient distance to surround a cylindrical stiffener and low friction bearings where the flanges change to rectangular lever arms extending from the pin toward the center for the top flange and from the pin away from the center for the bottom flange, having the bottom flange lever arm free end contacting the tee box beam through a screw jack and having the top flange lever free end contacting the tee box beam through a hydraulic jack.

2. The structural element of claim 1 wherein the cantilever beam consists of an I beam with curved top view.

3. A cell type structural element as set forth in claim 1 wherein there is a plurality of the cantilever beam type structural elements, connected together structurally by a box beam circular in top view.

4. A cell type structural element as set forth in claim 1 wherein there are three of the cantilever beam type structural elements connected together structurally by a box beam forming a triangle in top view.

* * * * *